Nov. 17, 1964 D. DE GORTER 3,157,329

APPARATUS FOR BREAKING GLASS

Original Filed Feb. 16, 1959

DANIEL De GORTER

BY Bauer and Seymour

ATTORNEYS

United States Patent Office 3,157,329

Patented Nov. 17, 1964

1

3,157,329
APPARATUS FOR BREAKING GLASS

Daniel De Gorter, 35 E. 35th St., New York, N.Y.

Original application Feb. 16, 1959, Ser. No. 793,417, now Patent No. 3,116,862, dated Jan. 7, 1964. Divided and this application Apr. 10, 1963, Ser. No. 271,988
9 Claims. (Cl. 225—93)

This invention relates to a new and novel method of breaking glass and new and novel instruments for carrying out the process.

One of the objects of the present invention is to provide a new and novel method of breaking thick sheets of glass wherein the break is clean and along a predetermined path.

Another object is to provide a new and novel method and a new and novel instrument for breaking any thickness of glass along any desired pattern or path.

Another object is to provide a new and novel method of breaking glass along a predetermined path by subjecting the surface of the glass along said path to a series of rapid percussion vibrations.

Another object is to provide a new and novel method of breaking glass along a predetermined path by subjecting the surface of the glass along said path to ultrasonic vibrations.

Another object is to provide a method of breaking thick glass by simultaneously or sequentially subjecting the surfaces to be broken to high frequency and intensity vibrations.

Another object is to provide a new and novel instrument for producing 5,000 to 20,000 vibrations per minute and which is adapted to transmit said vibrations to a glass surface which is to be broken.

A still further object is to provide a new and novel instrument for producing ultrasonic vibrations in the range of 16,000 to 160,000 vibrations per second and which is adapted to transmit said vibrations to a surface of the glass to be broken.

Other objects of the invention wil become apparent as the specification and drawings are studied.

In the drawings wherein like reference characters refer to like parts throughout the several views, FIG. 1 is a perspective view of a glass sheet showing scratch lines on the top and bottom surfaces to define the area along which the sheet is to be broken;

It is well known that when a deep enough scratch is made on the surface of glass a weak zone is created in the structure of the glass and may cause local breakage which, under certain conditions may extend much beyond the location of the original scratch. It is on the basis of this phenomenon that the art of cutting glass has been developed. It is also well known that by using a diamond point, or a sharp metal wheel, or some other hard material, deep cuts can be developed on the surface of glass so that when the proper strain is applied to the glass areas abutting such cuts the breakage will occur along those cuts. While it is easy to break pieces of glass having a thickness of 1/16 or 1/8 of an inch according to the above described method, the problem becomes more difficult when this method is applied to a piece of glass 1/4 inch

2 thick requiring the scratch to be much deeper. This problem becomes increasingly more difficult when applied to pieces of glass having a thickness of 5/16, 3/8 or 1/2 of an inch, the last-mentioned glass thicknesses being those most frequently used in the glazing of large openings. When the glass to be cut has a thickness of several inches, or even several feet, as is the case of protective glass now being used for openings in atomic plants, the above-described method will not operate. The present invention is directed to solving this problem of cutting thick glass along a predetermined path or pattern. It was found that the best method of cutting glass of any thickness was to subject the surface of the glass to vibrations of sufficiently high frequency and of sufficient intensity, preferably along the scratch lines made in the usual manner, to cause the glass to break evenly along this scratch line. This method is even more applicable when it is desired to cut a complicated pattern extending from one edge of the sheet to the other or when the area to be cut comprises a closed pattern contained within the edges of the glass sheet.

Figure 1:
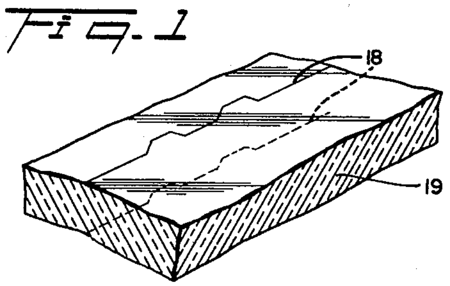
Figure 2:
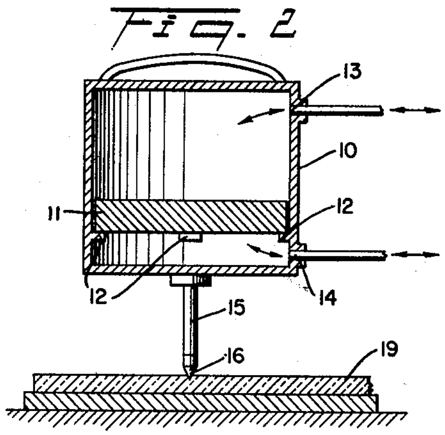
FIG. 2 is a side elevational view, shown partly in cross-section, of one form of instrument for breaking glass.
Figure 3:
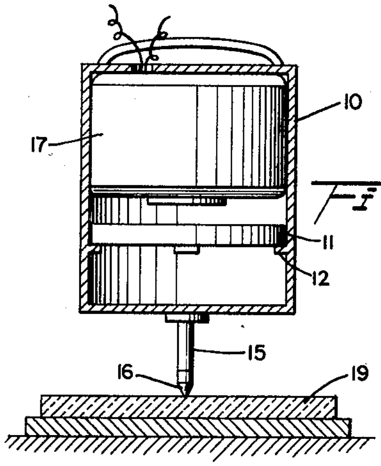
FIG. 3 is a side elevational view, shown partly in cross-section, of another form of instrument for breaking glass.

Referring now to the drawings, there is shown a suitable instrument embodying the present invention which is particularly adapted for the cutting of complicated glass patterns or glass up to 1/2 of an inch in thickness. FIG. 2 shows an instrument having a cylinder 10 and a floating piston 11 mounted therein. A plurality of lugs 12 are circumferentially spaced about the lower inner surface of cylinder 10 and serve as a stop for piston 11. Ports 13 and 14 open into the top and bottom of the cylinder, respectively, and on either side of the floating piston. These ports are operatively connected to separate sources of fluid pressure which are not shown. The sources of fluid pressure alternately operate at a rapid rate to cause the piston to oscillate within the cylinder at a high speed. When the piston is forced downwardly during the injection of fluid through port 13 it strikes the lugs 12 and causes the entire cylinder to vibrate. A downwardly depending arm 15 having a hardened point 16 such as a diamond, or a hardened metal point or wheel at one end is securely fastened at its other end to the lower surface of the cylinder. Consequently, as the piston repeatedly strikes the lugs 12 vibrations are set up in the cylinder which are in turn transmitted to the arm 15 and the hard point 16. By controlling the speed of the alternate feeding of fluid pressure the hard point of the instrument can vibrate in the range of about 5,000 to 20,000 vibrations per minute. There is shown in FIG. 3 a modification of the instrument shown in FIG. 2 wherein the fluid pressure source and ports are replaced by an electromagnet 17 which is connected with a source of oscillating current, not shown, to cause the piston 11 to rapidly move up and down in its cylinder. Vibrations within the range of 5,000 to 20,000 vibrations per minute can be realized on this instrument and controlled through the oscillator. The instruments shown in FIGS. 2 and 3 are particularly adapted for use on flat and smooth glass, like plate or window glass, having a thickness up to 1/4 or 3/8 of an inch thick, and on rough surfaced glass, like figured or rough cast glass, having a thickness up to 1/4 of an inch. As shown in FIG. 1, a scratch line 18 is formed on one or both plane surfaces of a sheet of glass. The vibrator shown in either FIG. 2 or 3 can be held during operation by a suitable handle mounted on the top of the cylinder and the sharp vibrating point can be directed along the scratch lines to cause the glass to form a clean break. The use of the above apparatus becomes even more imperative where the scratch line is in the form of a circle or a complicated pattern or where the surface of the sheet is rough so that the scratch is discontinuous and consequently the zone of least resistance obtained in the glass is discontinuous.

Figure 4:
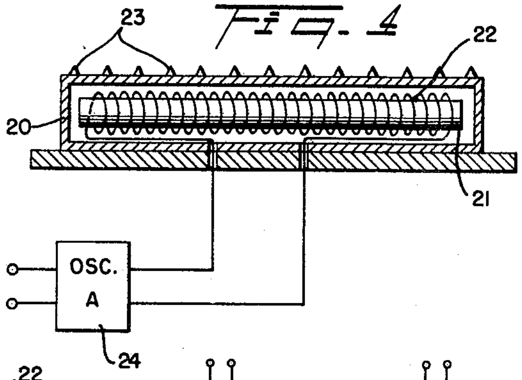
FIG. 4 is a cross-sectional view of the instrument for creating ultrasonic vibrations for breaking glass.

It has been found that the use of percussion-vibration instruments of the type described above to cause breakage of sheets of glass having a thickness in excess of ½ of an inch is unsatisfactory because such instruments have a tendency to create, in the thickness of the glass, local fractures which mar the final cut. In addition, the noise of such percussion-vibration instruments becomes more and more obnoxious as the frequency and intensity of the vibration increases. For sheets of glass having a thickness in excess of ½ of an inch, it has been found necessary to use instruments which create inaudible vibrations called "ultrasonic" vibrations which can be applied against the surface of the glass and which, because of their high frequency and intensity, create in the mass of the glass itself vibrations of such intensity that the glass will break easily along the scratch lines formed on one or both surfaces. In those cases where the scratch lines are located on both surfaces, the scratch on the first surface is located in a plane perpendicular to said surface and passing through the scratch made on the second surface. A suitable instrument for accomplishing this result is a transducer as shown in FIG. 4 wherein a stainless steel casing 20 encloses a bar of barium titanate 21 or other suitable material which expands under the influence of an electrical current and contracts when the electrical current is cut off. An electrical conducting wire 22 is spirally wound about the bar 21. In the disclosed embodiment, the casing 20 is about 2 inches wide, 1 inch deep and 2 or 3 feet long. It is to be understood, however, that these dimensions can be varied without departing from the principles of this invention. The upper surface of casing 20 is studded with a plurality of spaced apart protrusions 23 and upon which the scratch line on a sheet is held in aligned contact for breaking the glass. The ends of wire 22 are electrically connected to an oscillator 24 which in turn is electrically connected to a source, not shown. The protrusions 23 may be positioned in a straight line as shown or in any pattern corresponding to the desired shape of the area to be cut. The disclosed transducer produces vibrations in the order of 16,000 to 160,000 vibrations per second with the frequency and intensity of the vibrations being selectively controlled by the output of the oscillator.

Figure 5:
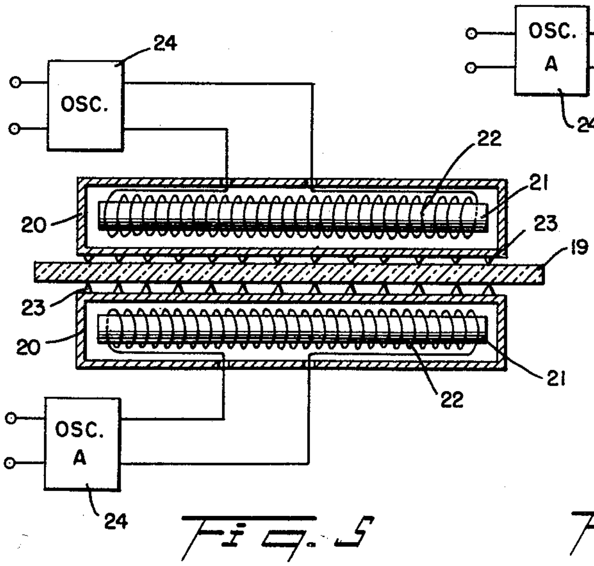
FIG. 5 is a cross-sectional view of a modified form of the instrument shown in FIG. 4 for creating ultrasonic vibrations for breaking glass.

FIG. 5 shows a modification of the instrument of FIG. 4 wherein two transducers having the same construction and operation as shown in FIG. 4 are placed on opposite sides of the sheet, the protrusions on each being in alignment with a scratch surface on either side of the sheet. It has been found that glass having a thickness up to ½ of an inch can be easily and readily cut by resting the sheet of glass on the transducer shown in FIG. 4 so that the scratch line is in alignment with the protrusions 23 on the top surface of the transducer. By causing the transducer to produce at least 16,000 vibrations per second, there is created in said glass a vibrating condition of such magnitude that the glass will break, either by itself, or under a slight pressure on the surface of the glass adjacent the scratch lines and form a neat cut. The frequency and intensity of the vibrations can be controlled through a wide range to accommodate various thicknesses and types of glass. While the length of the transducer is disclosed as 2 or 3 feet, it is understood that the transducer can be moved along the scratch line of a much longer sheet as many times as necessary in order to cut the entire length of the scratch line. In addition, the breaking of the glass sheet is greatly facilitated if scratch lines are formed on opposite surfaces of the glass in the manner previously described. For glass having a thickness greater than ½ of an inch, the modified transducer as shown in FIG. 5 is used and the vibrations are either applied simultaneously or in sequence to the scratch lines on each surface.

Figure 6:
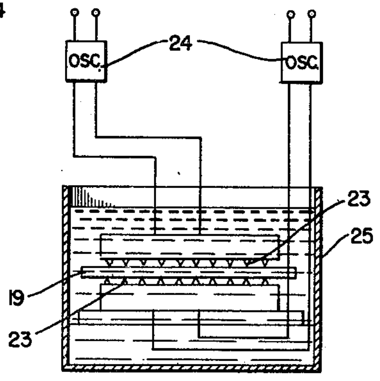
FIG. 6 is a cross-sectional view of the instrument shown in FIG. 5 submerged in a fluid bath.

FIG. 6 shows a further modification of a transducer structure wherein either one or two of the transducers shown in FIG. 4 are located in a tank 25 which is filled with water or other suitable liquid. It has been found that in breaking sheets of glass having very great thicknesses, for example several inches, a more perfect contact is obtained between the vibrating liquid and the glass to be broken than is the case when the contact is merely between the solid vibrator and the glass. In this embodiment, either one transducer located below the sheet of glass or a transducer below and another above the sheet of glass may be used in the same manner as they are used outside the tank of liquid.

This invention is also applicable to cutting glass which is in a cubical or elongated cubical form so that it becomes necessary to make scratch lines not only on the upper and lower surfaces but also on the lateral surfaces of the blocks. For such shapes of glass, transducers as shown in FIG. 4 having appropriate lengths are placed adjacent the scratch lines on each surface may be successively subjected to the vibrations of the transducer to complete the breaking thereof. Furthermore, the transducers may be operated in a fluid, as shown in FIG. 6, for extra thick glass.

While the present invention is herein illustrated and described in relation to the cutting of glass sheets, it is to be understood that it is equally applicable to other forms and shapes of glass. Additionally, while the instruments creating the vibrations have been disclosed in rather specific detail as the types of percussion-vibrators and transducers, it is to be understood that other instruments which produce the desired frequency and intensity of vibrations may be used, without departing from the spirit and scope of this invention.

This application is a division of my application Serial No. 793,417, filed February 16, 1959, now Patent No. 3,116,862.

What is claimed is:

1. Apparatus for applying vibration to a surface which comprises a contact adapted to engage the surface, a cylinder attached thereto, a free piston in the cylinder, means to vibrate the piston in the cylinder, and means to transmit the vibrations to the contact.

2. An apparatus for cutting glass having a scratch line on at least one of its surfaces to define the cutting path, comprising vibrating means to support said glass and to transmit to the lower surface of said glass and to said scratch line impact vibrations of high frequency and intensity, and a second vibrating means to contact and to transmit to the upper surface of the glass and to said scratch line impact vibrations of high frequency and intensity, whereby said glass is caused to be cut.

3. An apparatus for cutting glass having a scratch line on at least one of its surfaces to define the cutting path, comprising a vibrating means to support said glass and to transmit to the lower surface of said glass and to said scratch line impact vibrations of high frequency and intensity, and means to interpose a layer of liquid between the said vibrating means and the lower surface of said glass during the cutting.

4. A glass breaker adapted to break glass along the line of a score consisting in its essential elements of an elongated transducer, a casing therefor, said casing having a line of points adapted to enter into and follow the line of the score, and means to supply current to the transducer.

5. Apparatus for breaking glass along the line of a score including a tank adapted to hold a liquid, a transducer mounted in the tank below the liquid level, a line of points mounted on the transducer so as to be vibrated thereby against the face of the glass along the line of the score, and means to supply the transducer with oscillating current.

6. Apparatus for breaking glass along the line of a score which comprises a cylinder, an electromagnet therein, an external point attached thereto adapted to enter the line of the score, a vertically movable weight in the cylinder, and means to turn the magnet on and off rapidly whereby to generate impact vibrations of high frequency at the point by the rising and falling of the weight.

7. Apparatus for breaking glass along the line of the score which comprises a cylinder, a free weight within the cylinder, pneumatic means to raise and lower the weight rapidly in the cylinder whereby to generate the impact vibrations of high frequency and intensity, and a point attached to the cylinder which is adapted to act upon the score.

8. Apparatus for severing glass along the line of a score comprising a casing having a multiplicity of aligned points adapted to fit the line of the score, and means within the casing to generate vibrations of high frequency and intensity in the points toward the score line.

9. Apparatus for severing glass along the line of a score which comprises an elongated casing having a row of points adapted to fit the line of the score, transducer means within the casing to generate vibrations of high frequency and intensity in the points toward the score line, and means to supply power to the said vibrations-producing means.

References Cited in the file of this patent

UNITED STATES PATENTS

| | | |
|---|---|---|
| 2,292,555 | Wesch | Aug. 11, 1942 |
| 2,337,569 | Pietschack | Dec. 28, 1943 |
| 2,982,456 | Hsu et al. | May 2, 1961 |
| 3,029,766 | Jones | Apr. 17, 1962 |
| 3,116,862 | De Gorter | Jan. 7, 1964 |